E. LANDSTROM & A. LANDSTROM.
SAWING-MACHINES.
No. 184,247. Patented Nov. 14, 1876.
2 Sheets—Sheet 2.
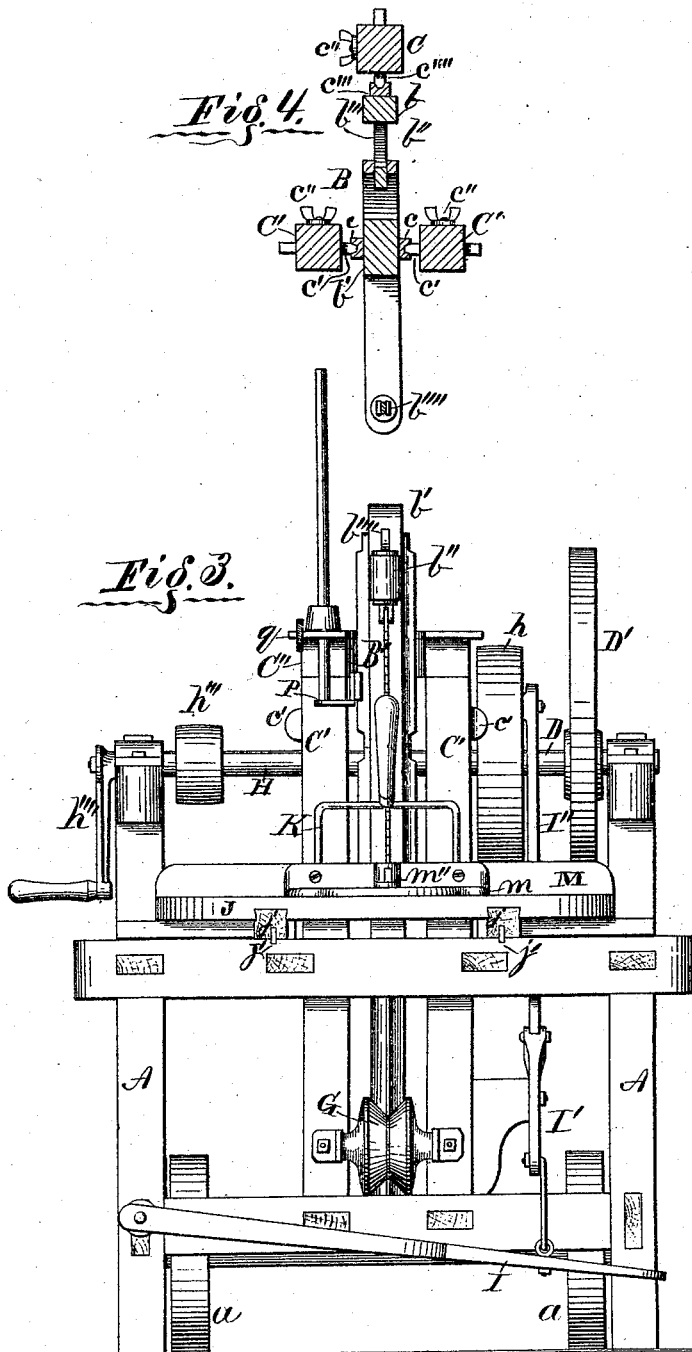

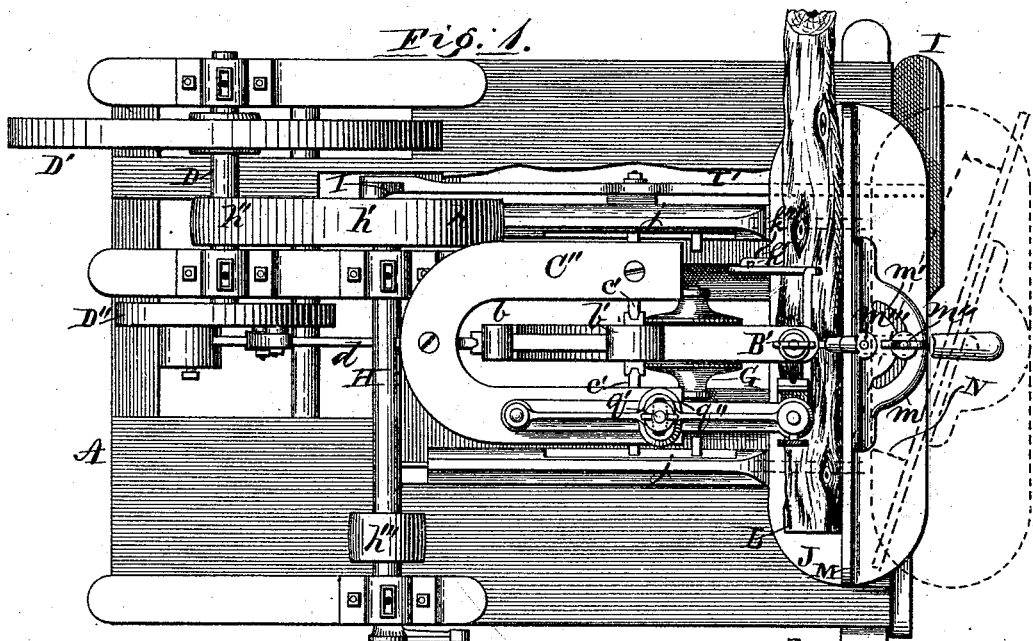
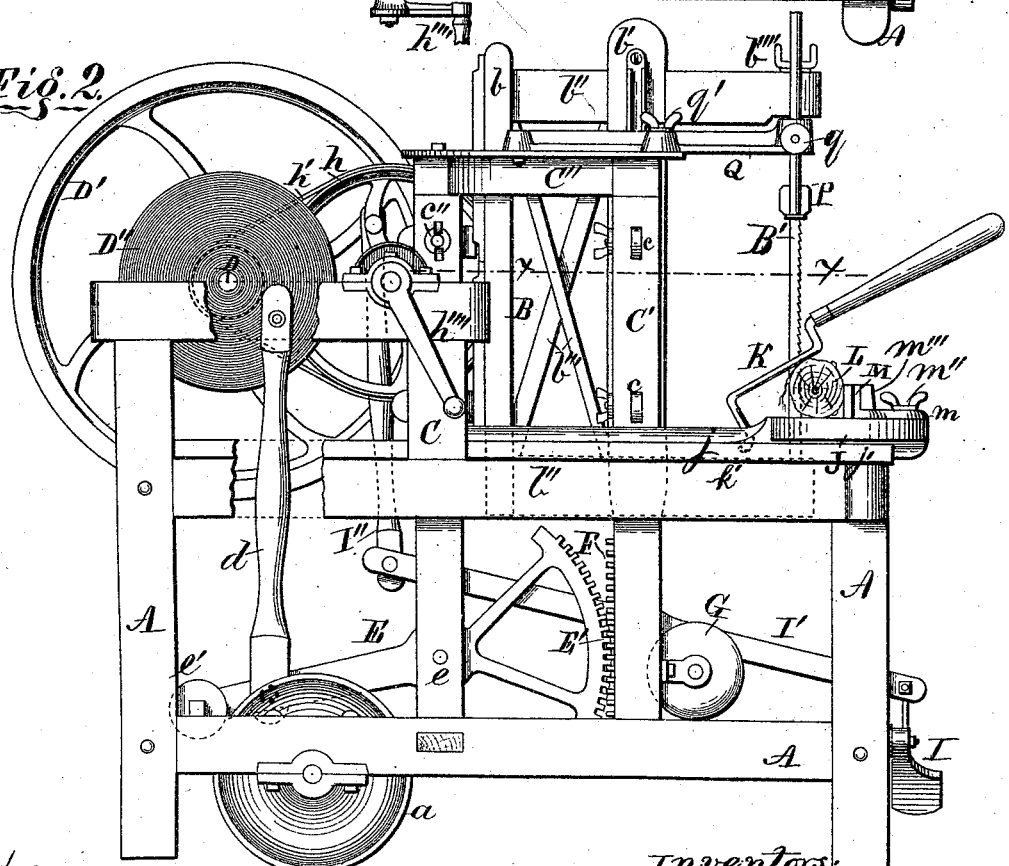

UNITED STATES PATENT OFFICE.

EREC LANDSTROM, OF GALESBURG, AND ANDERS LANDSTROM, OF CHAMPAIGN, ILLINOIS.

IMPROVEMENT IN SAWING-MACHINES.

Specification forming part of Letters Patent No. 184,247, dated November 14, 1876; application filed September 2, 1876.

*To all whom it may concern:*

Be it known that we, EREC LANDSTROM, of Galesburg, Knox county, and ANDERS LANDSTROM, of Champaign, Champaign county, and State of Illinois, have invented certain new and useful Improvements in Sawing-Machines; and we do hereby declare that the following is a full, clear, and exact description thereof, which will enable others skilled in the art to which it appertains to make and use the same, reference being had to the accompanying drawings, and to letters of reference marked thereon, which form a part of this specification.

The nature of our invention relates to improvements in sawing-machines, adapting it to use for cross-sawing, and rip and gig sawing; and the invention consists in certain new and improved devices, and combinations of devices, whereby the operation of such machines is rendered more easy and effective, all as hereinafter more fully set forth.

In the accompanying drawings, Figure 1, Sheet 1, is a top view of a machine embodying our improvements. Fig. 2, Sheet 1, is a side elevation of Fig. 1, partly broken away. Fig. 3, Sheet 2, is an end elevation of the same. Fig. 4, Sheet 2, is a sectional view of those parts of Fig. 2 crossed by the line $x\, x$.

Referring to the parts by letters, letters A represent the parts of the main frame, consisting of any suitably-constructed rectangular frame, supported on rollers $a$, on which it may be easily moved from place to place. B is the saw-frame, consisting of bars $b\, b'$, united by bars $b''$ and braces $b'''$, forming a rectangular frame, the bars $b''$ projecting, and having the saw B' adjustably secured in their outer ends by set-screws $b''''$, in the ordinary manner. C C' C' are three vertical bars, secured in the frame A in any suitable manner, and their upper ends held firmly in place by bolting to a horseshoe-shaped bar, C''. These bars are placed as shown at Fig. 4—the bars C' C', one on each side of the bar $b'$, and the bar C in rear of the bar $b$. The bar $b'$ has longitudinally-grooved plates $c$ on its opposite sides, which fit upon guide-blocks $c'$, which are adjustably secured in the bars C' C' by set-screws $c''$, so as to allow a reciprocating vertical movement of the saw-frame. The bar $b$ has also a grooved plate, $c'''$, secured to its rear side, which runs upon guide-blocks $c''''$ in the bar C, for the same purpose as the plates $c$. The blocks $c'\, c''''$ may be tightened up or adjusted by means of the set-screws $c''$, to compensate for wear between them and the grooved plates $c\, c'''$. The bar C'' will hold the bars C C' C' firmly in position, and the triangular arrangement of the bars C C' C' in relation to the saw-frame B is such as to form a very secure frame, in which the saw-frame may operate when in use. D is a shaft, supported in suitable bearings in the frame A, and carries on one end the balance-wheel D', and on its other end the crank-wheel D'', from the wrist-pin of which a connecting-rod, $d$, extends to, and is connected with, one end of a sector-gear, E', as shown plainly at Fig. 2. The sector-gear E' is pivoted or journaled to the lower extended end of the bar C, at $e$, and has upon one end toothed gear, which meshes with a similarly-toothed rack-bar, F, which is secured to the rear side and lower extended end of the bar $b'$. The rear end of the vibrating lever E carries a weight, $e'$, which counterbalances the weight of the saw-frame B and the saw. G is a pulley, hung in axial bearings from the lower ends of the bars C' C', and in such manner as to rest against the lower end of the bar $b'$, opposite where the sector E' rests, and prevent any side strain against the saw-frame from the pressure of said sector. H is a shaft, having suitable bearings in the frame A, and carries a band-wheel, $h$, geared, by a band, $h'$, with the band-wheel $h''$ on the shaft D, and also carries a band-pulley, $h'''$, through which motion may be received from any suitable power, and a crank, $h''''$, by which the machine may be operated by hand. Provision is also made for operating the machine by foot-power, through the agency of the pedal I, lever I', and rod I'', which extends from the lever I' to a wrist-pin on the wheel $h$.

It is not deemed necessary to describe more fully the communication of motion between the parts hereinbefore described, as it is in the obvious and evident manner, the construction being such that the driving or main shaft may be rotated in either direction.

J is a table-board, with projecting bars $j$, which slide on ways $j'$, and allow the table J to be moved toward and receded from the saw B'. K is a clamping-bar, having a handle at one end, and bifurcated at its other, the bifurcated ends having small lugs $k'$, which may be sprung into or released from journal-bearings in standards $k''$ by simply pressing the bifurcated ends toward each other. For sawing the wood L, as shown at Figs. 1 and 2, the clamping-bar K is used, as shown at same figures, to hold the wood L in place upon the table J, which may then be moved up to the saw for its action. For other sawing, the clamping-bar K is removed by simply pressing its bifurcated ends toward each other. M is a guide-bar, with a plate, $m$, on its rear side, having a segment-slot, $m'$, through which a stay-bolt, $m''$, passes and stays, while it permits the bar M to be oscillated on the pivot $m'''$. For rip-sawing, the guide-bar M may be placed as shown at Fig. 1, and the table J be drawn in or out, to adjust the distance between the saw and bar M. The saw then being adjusted to cut parallel with the bar M, the rip-sawing may be accomplished by sliding the material in the ordinary manner. For bevel-sawing, the bar M may be adjusted as shown at Fig. 1 by dotted lines, where dotted lines N also show the material to be operated upon. P is a presser-foot, which may be used to rest against and stay the saw-blade, and to rest upon and stay light boards, &c., while being sawed. Its standard is adjustable vertically in an arm, Q, by a set-screw, $q$. The arm Q is pivoted at one end on the bar C'', on which it may be oscillated, and may be fixed in any desired position by a set-screw, $q'$, which passes through a slot, $q''$, in the bar Q and into the bar C''.

For use as a gig-saw, a suitable table-board may be placed on the bars $j$, and the end of the saw be detached for properly placing the work, in the usual manner.

What we claim as new, and desire to secure by Letters Patent, is—

1. The sector-gear E', attached to the vibrating lever E, provided with an adjustable balance-weight, in combination with the rack-bar F, arranged to operate the saw-frame B, substantially as and for the purpose specified.

2. The pedal I, lever I', and connecting-rod I'', in combination with the wheels $h$ and D'', rod $d$, sector-gear E', bar F, and saw-frame B, substantially as and for the purpose specified.

3. The plate or bar C'', combined with the bars C C' C' and saw-frame B, substantially as described, and for the purpose specified.

4. The bar M, secured to the table J, as described, and combined with the saw-frame B and sliding table J, substantially as described, and for the purpose specified.

In testimony that we claim the foregoing as our own we affix our signatures in presence of two witnesses each.

EREC LANDSTROM.
ANDERS LANDSTROM.

Witnesses for E. LANDSTROM:
THOMAS MCKEE,
W. B. RICHARDS.

Witnesses for A. LANDSTROM:
PETER LUNDIE,
OLOF EKBOM.